US012406274B2

(12) United States Patent
Councill

(10) Patent No.: US 12,406,274 B2
(45) Date of Patent: Sep. 2, 2025

(54) UNSUPERVISED APPARATUS AND METHOD FOR GRAPHICALLY CLUSTERING HIGH DIMENSIONAL PATRON CLICKSTREAM DATA

(71) Applicant: Truist Bank, Charlotte, NC (US)

(72) Inventor: Peter Councill, Richmond, VA (US)

(73) Assignee: TRUIST BANK, Charlotte, NC (US)

( * ) Notice: Subject to any disclaimer, the term of this patent is extended or adjusted under 35 U.S.C. 154(b) by 521 days.

(21) Appl. No.: 17/749,391

(22) Filed: May 20, 2022

(65) Prior Publication Data

US 2023/0334513 A1    Oct. 19, 2023

Related U.S. Application Data

(63) Continuation of application No. 17/659,407, filed on Apr. 15, 2022.

(51) Int. Cl.
*G06Q 30/0201* (2023.01)
*G06F 18/23211* (2023.01)
*G06N 5/022* (2023.01)

(52) U.S. Cl.
CPC ... *G06Q 30/0201* (2013.01); *G06F 18/23211* (2023.01); *G06N 5/022* (2013.01)

(58) Field of Classification Search
CPC .................................................. G06Q 30/0201
See application file for complete search history.

(56) References Cited

U.S. PATENT DOCUMENTS

| 7,278,105 | B1 * | 10/2007 | Kitts | H04L 67/535 |
| | | | | 715/736 |
| 10,115,121 | B2 * | 10/2018 | Pai | G06Q 30/0204 |
| 11,799,734 | B1 * | 10/2023 | Strong | H04L 67/146 |
| 2009/0164395 | A1 * | 6/2009 | Heck | G06F 16/954 |
| | | | | 706/16 |

(Continued)

OTHER PUBLICATIONS

Requena, Borja, et al. "Shopper intent prediction from clickstream e-commerce data with minimal browsing information." Scientific reports 10.1 (2020): 16983. (Year: 2020).*

(Continued)

*Primary Examiner* — Andre D Boyce
(74) *Attorney, Agent, or Firm* — Michael A. Springs, Esq.; Shumaker, Loop & Kendrick, LLP; Patrick B. Horne

(57) ABSTRACT

Groups of patrons may be discovered by measuring website and mobile site patron clickstream data in a mathematical and unsupervised way over a predetermined time and by graphically clustering the patron clickstream data using non-linear dimensionality reduction in the form of a Uniform Manifold Approximation and Projection algorithm (UMAP). The data from the UMAP may then be feed into a Density Based Spatial Clustering of Applications with Noise algorithm (DBSCAN) in order to identify a center of each cluster. Next, using the data from the UMAP and the center of each cluster from the DBSCAN, a K-Nearest Neighbor algorithm (KNN) may be applied to identify data points closest to the center of each cluster and to shade each of the data points to graphically identify each cluster of the plurality of clusters. Next, illustrate a graph on the display representative of the data points shaded following application of the KNN.

20 Claims, 4 Drawing Sheets

(56) References Cited

U.S. PATENT DOCUMENTS

| | | | | |
|---|---|---|---|---|
| 2014/0101580 | A1* | 4/2014 | Shen | G06F 3/0481 |
| | | | | 715/764 |
| 2014/0172547 | A1* | 6/2014 | Subramanian | G06Q 30/0246 |
| | | | | 705/14.45 |
| 2015/0269609 | A1* | 9/2015 | Mehanian | G06Q 30/0254 |
| | | | | 705/14.45 |
| 2016/0078454 | A1* | 3/2016 | Ellen | G06N 7/01 |
| | | | | 705/7.29 |
| 2019/0362408 | A1* | 11/2019 | Srinivasan | G06F 16/955 |
| 2019/0362409 | A1* | 11/2019 | Srinivasan | G06Q 30/0201 |
| 2021/0019213 | A1* | 1/2021 | Mestres | G06F 11/3438 |
| 2021/0042638 | A1* | 2/2021 | Novotny | G06N 20/00 |
| 2021/0192549 | A1* | 6/2021 | Sinha | G06Q 30/0201 |
| 2021/0248617 | A1* | 8/2021 | Mattarella-Micke | |
| | | | | G06Q 30/0281 |
| 2022/0391445 | A1* | 12/2022 | Martinec | G06N 5/01 |
| 2023/0162241 | A1* | 5/2023 | Saunkeah | G06Q 30/0276 |
| | | | | 705/14.72 |

OTHER PUBLICATIONS

Hahsler, Michael, and Matthew Bolaños. "Clustering data streams based on shared density between micro-clusters." IEEE transactions on knowledge and data engineering 28.6 (2016): 1449-1461. (Year: 2016).*

Wang, Gang, et al. "Clickstream user behavior models." ACM Transactions on the Web (TWEB) 11.4 (2017): 1-37. (Year: 2017).*

Smit, Gijs, et al. "Customer Segmentation using Clickstream Data." Bachelor Thesis, Eindhoven University of Technology, Eindhoven (2019). (Year: 2019).*

* cited by examiner

UNSUPERVISED APPARATUS AND METHOD FOR GRAPHICALLY CLUSTERING HIGH DIMENSIONAL PATRON CLICKSTREAM DATA

CROSS REFERENCE TO RELATED APPLICATIONS

This application is a continuation application tracing priority to U.S. application Ser. No. 17/659,407 filed on Apr. 15, 2022, the entirety of which is herein expressly incorporated by reference.

TECHNICAL FIELD AND BACKGROUND OF INVENTION

This invention relates generally to the field of patron datamining and improving understanding of patron-enterprise interactions. More particularly, the invention relates to utilizing machine learning and unsupervised machine data clustering and identification to graphically illustrate and to analyze clusters of patron-enterprise interactions.

Prior art systems for analyzing human interactions were carried out via patron studies and patron surveys. Unfortunately, such surveys have inherent, irreconcilable flaws. Such studies may be limited in scale because of the high cost to conduct and analyze the results. Second, obtaining patron permissions may prove difficult and may ultimately skew results based on survey participants. Third, and perhaps most critically, surveys and studies must rely on known questions or at least hypotheses and unknown behaviors cannot be anticipated.

Accordingly, there is a need in the art for a system that may not be limited in scope, that is cost efficient, and that does not rely on known hypotheses or categories but may be allowed to operate in an unsupervised and mathematical way.

BRIEF SUMMARY

It is therefore an object of the present invention to provide an apparatus and method of analyzing clusters of patron-enterprise interactions that do not rely on known questions or hypotheses. As used herein, a patron may be a user, customer, or other person who engages with an enterprise or an entity. As used herein, an enterprise or an entity may be a bank, a merchant, or other entity interacting with patrons.

It is a further object of the present invention to provide an apparatus and method of analyzing clusters of patron-enterprise interactions that utilizes unrestricted raw patron clickstream data in an unsupervised way via non-linear dimensionality reduction algorithms and clustering cluster identification algorithms to graphically illustrate patron segmentation.

These and other objects and advantages of the invention are achieved by providing an apparatus having a processor, a display operably connected to the processor; and a memory, operably connected to the processor. The memory may have stored instructions that, when executed by the processor, cause the processor to, during a predetermined period, collect network traffic data in the form of patron clickstream data. The processor may extract the patron clickstream data and transform the patron clickstream data into a probability matrix, where the probability matrix comprises a probability that a patron would proceed from a first page to a second page. The processor may transform the probability matrix by reducing dimensionality into two dimensional data using a Uniform Manifold Approximation and Projection algorithm (UMAP) and generate a cluster graph visualizing a plurality of clusters. The processor may feed the two dimensional data into a Density Based Spatial Clustering of Applications with Noise algorithm (DBSCAN) and identify a center of each cluster of the plurality of clusters. The process may, using the two dimensional data from the UMAP and the center of each cluster from the DBSCAN, apply a K-Nearest neighbor algorithm (KNN) to identify data points closest to the center of each cluster and shade each of the data points to graphically identify each cluster of the plurality of clusters. The processor may illustrate a graph on the display representative of the data points shaded following application of the KNN.

According to another embodiment of the invention, the predetermined time period may be 90 days.

According to another embodiment of the invention, the predetermined time period may be one month.

According to another embodiment of the invention, the memory may further include instructions that, when operated by the processor cause the processor to, following the application of the KNN, label observations of each cluster of the plurality of clusters based on common features.

According to another embodiment of the invention, the memory may further include instructions that, when operated by the processor cause the processor to, before the application of the DBSCAN, downsample the two dimensional data from the UMAP to reduce the density. According to such an embodiment, the KNN may subsequently be utilized to label the remaining data points in the respective clusters following the downsample.

According to another embodiment of the invention, the patron clickstream data may include clickstreams from a mobile based platform and/or a web based platform.

According to another embodiment of the invention, the patron clickstream data may further include data from 100,000 patrons who utilize the mobile based platform and/or the web based platform.

According to another embodiment of the invention, the apparatus may be characterized by a lack of any use of a Natural Language Processing algorithm (NPL).

According to another embodiment of the invention, a method for graphically clustering high dimensional patron clickstream data according to the invention may include the steps of: providing a computer having a processor and a display and a memory operably connected to the processor and loading the memory with computer code configured to receive and store patron clickstream data over a predetermined period and to extract the patron clickstream data into a probability matrix, to transform and reduce dimensionality of the patron clickstream data using a Uniform Manifold Approximation and Projection algorithm (UMAP), to identify a center of a plurality of clusters of the patron clickstream data using a Density Based Spatial Clustering of Applications with Noise algorithm (DBSCAN), to identify data points of each cluster using using a K-Nearest neighbor algorithm (KNN), and to illustrate a graph on the display representative of the data points following application of the KNN. Further steps may include extracting the patron clickstream data and transforming the patron clickstream data into the probability matrix, where the probability matrix comprises a probability that a patron would proceed from a first page to a second page, transforming the probability matrix by reducing dimensionality into two dimensional data using the UMAP and generating a cluster graph visualizing the plurality of clusters, feeding the two dimensional data into the DBSCAN and identify the center of each cluster of the plurality of clusters, applying the KNN to identify data points closest to the center of each cluster and shading each of the data points to graphically identify each cluster of the plurality of clusters; and illustrating the graph on the display representative of the data points shaded following application of the KNN.

According to another embodiment of the method of the invention, the predetermined time period may be 90 days.

According to another embodiment of the method of the invention, the predetermined time period may be one month.

According to another embodiment of the method of the invention the method may include the additional step of labeling observations of each cluster of the plurality of clusters based on common features following the application of the KNN.

According to another embodiment of the method of the invention the method may include the additional step of downsampling the two dimensional data from the UMAP to reduce the density before the application of the DBSCAN.

According to another embodiment of the method of the invention the KNN may be subsequently utilized to label the remaining data points in the respective clusters following the downsample.

According to another embodiment of the method of the invention the patron clickstream data may include clickstreams from a mobile based platform and/or a web based platform.

According to another embodiment of the method of the invention the patron clickstream data further may include data from 100,000 patrons who utilize the mobile based platform and/or the web based platform.

According to another embodiment of the method of the invention the method may be characterized by a lack of any use of a Natural Language Processing algorithm (NPL).

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
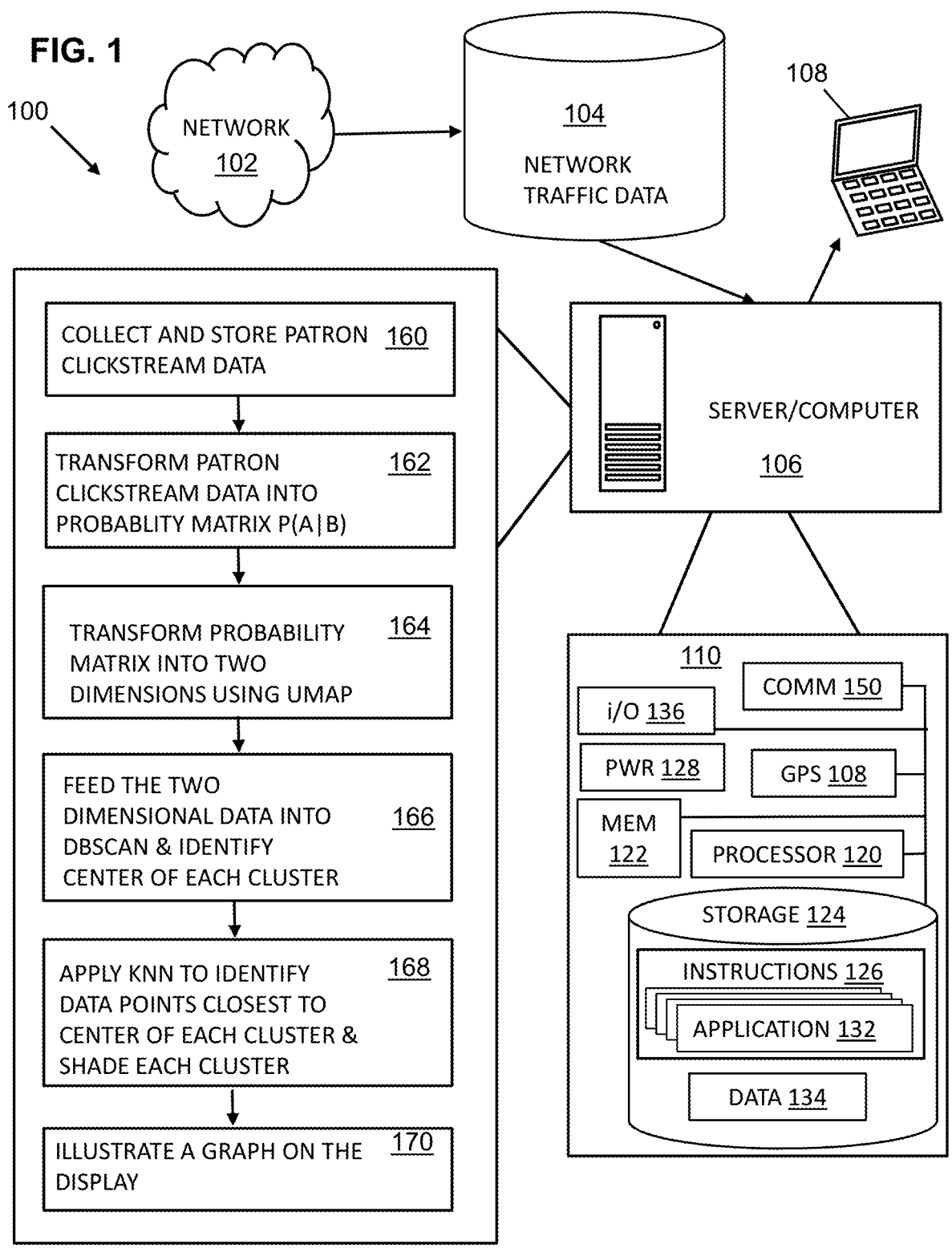
Figure 2:
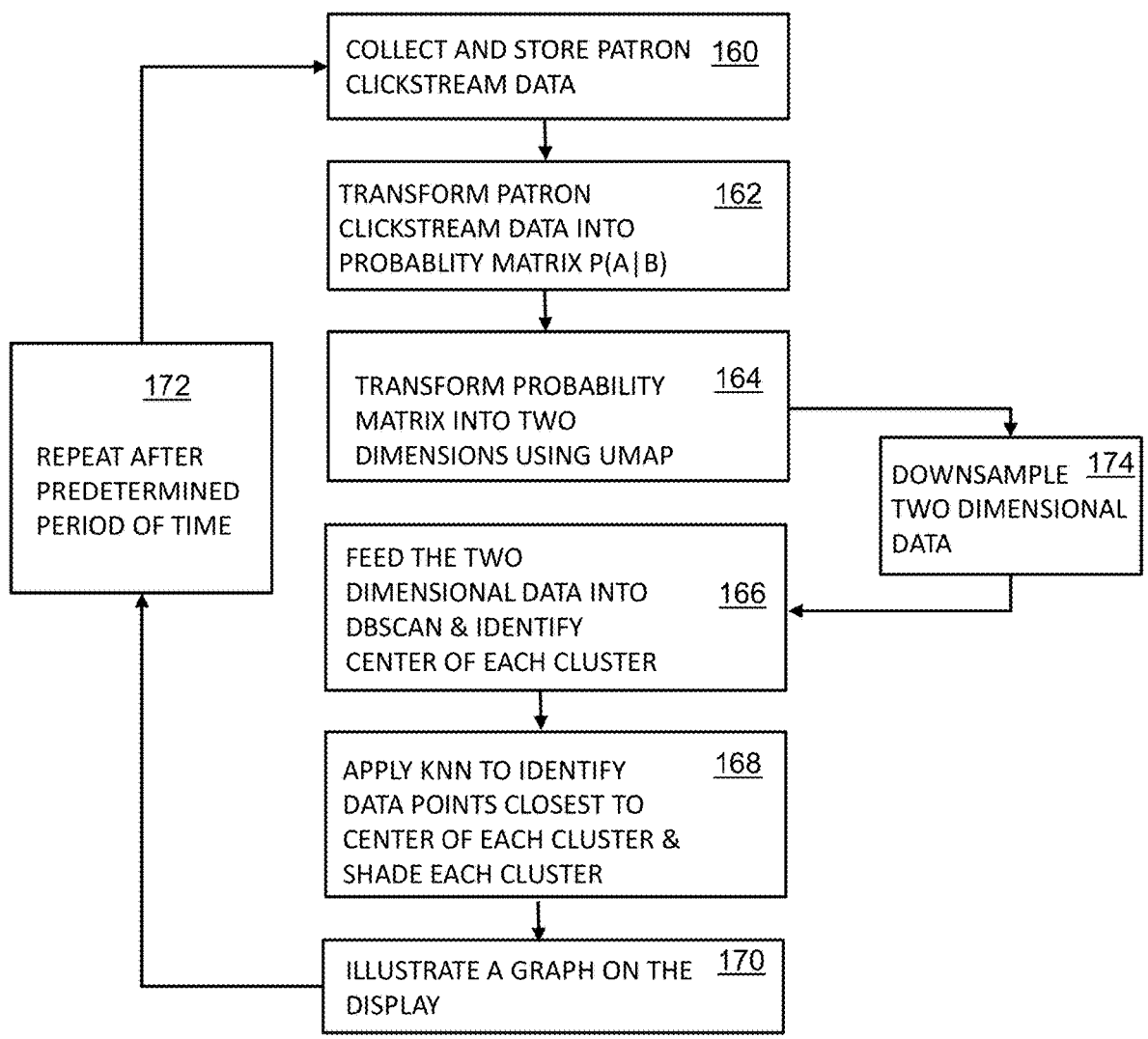
Figure 3:
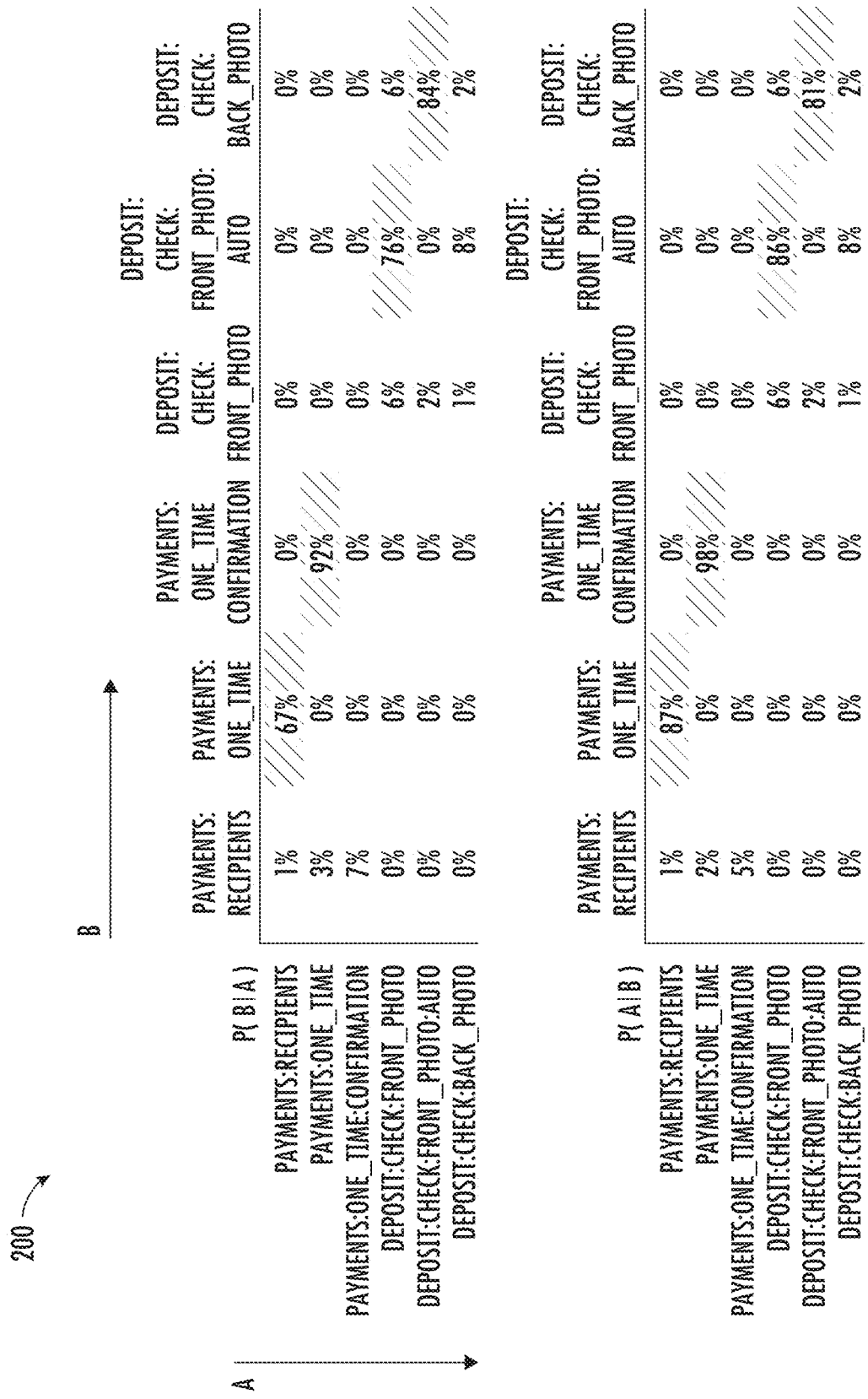
Figure 4:
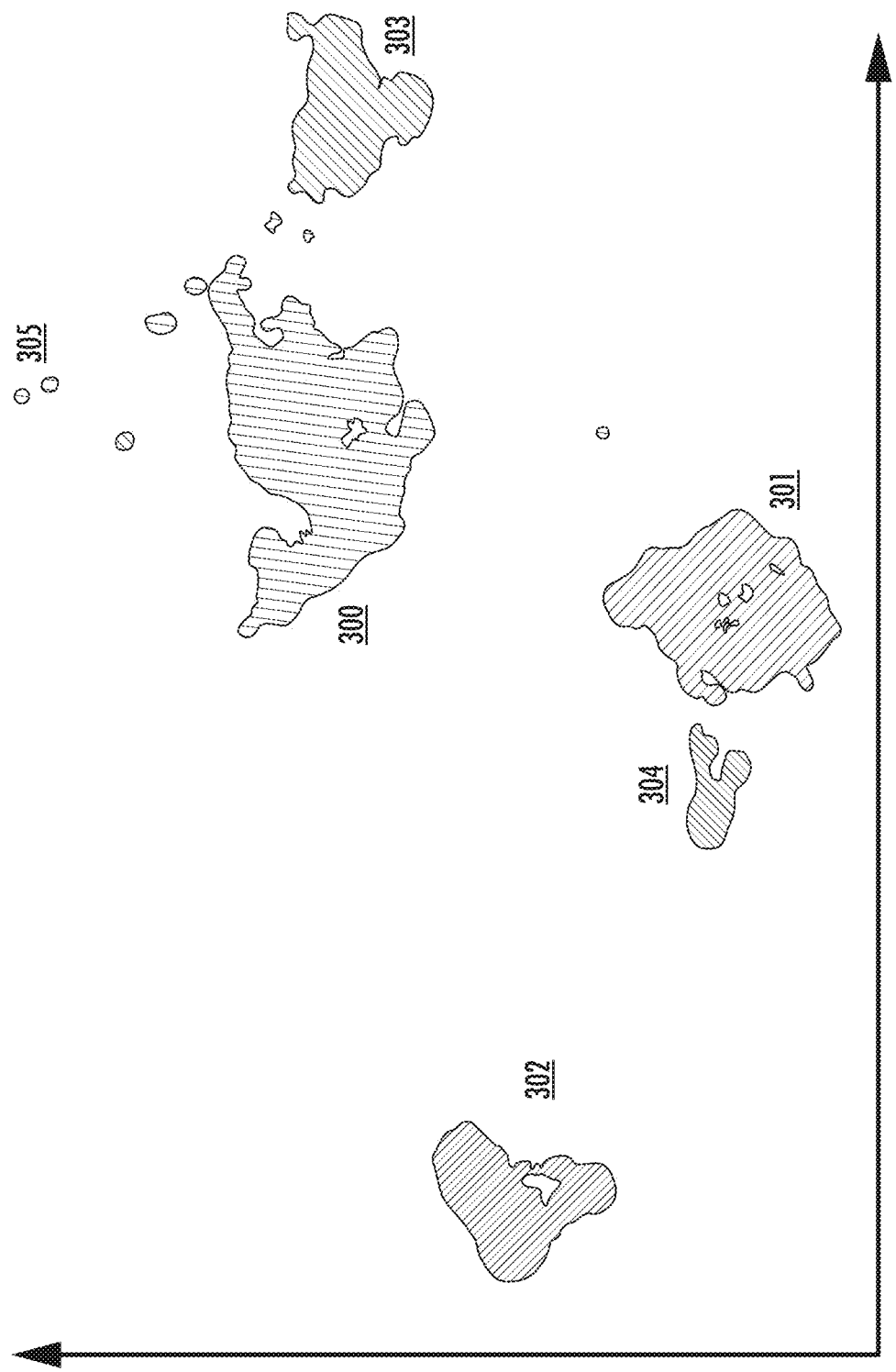

Having thus described embodiments of the invention in general terms, reference will now be made to the accompanying drawings, wherein:

FIG. 1 illustrates a system and apparatus together with a process flow chart, and environment thereof, according to at least one embodiment;

FIG. 2 is a process flow chart illustrating additional embodiments;

FIG. 3 is a page transition table illustrating exemplary probabilities of transitioning from one page to another; and FIG. 4 is an exemplary cluster graph which may be represented on a graphical user interface according to an embodiment.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system and apparatus 100 and environment thereof, according to at least one embodiment, by which an allies associated with an entity are able to analyze patron clickstream data to understand and discover groups of patrons by measuring the similarity of their behavior in a mathematical and an unsupervised way. The results are a function of the patrons' clickstreams only and not any prior selection of features, behaviors, or other criteria.

As shown in FIG. 1, patrons of the entity access the network 102 where their clickstreams are contained as network traffic data 104. A server computer 106 captures the clickstream data. The server computer may have a display 108 which, as shown, may be a connected computing device such as a mobile device, a laptop computer, a personal computer, and similar devices.

The server computer 106, includes internal hardware 110 which may include components such as, at least one of each of a processing device 120, and a memory device 122 for processing use, such as random access memory (RAM), and read-only memory (ROM). The server computer 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs, of which the application 132 is represented as a particular example shown in reference numerals 160, 162, 164, 166, 168 and 170. The storage device 124 can store various other data items 134, which can include, as non-limiting examples, cached data, files such as those for pictures, audio and/or video recordings, files downloaded or received from other devices, and other data items preferred by the ally or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the server computer 106 described herein. For example, the memory device 122 may include such applications as a conventional web browser application and/or a mobile P2P payment system client application. These applications also typically provide a graphical user interface (GUI) on the display 108 that allows the ally of the entity to communicate with the server computer 106, and, for example a mobile banking system, and/or other devices or systems.

The processing device 120 generally includes circuitry for implementing communication and/or logic functions of the server computer 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the server computer 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the ally device and the applications and devices that facilitate functions of the ally device, or are in communication with the ally device, to implement the functions described herein and others not expressly described. For example, the storage device may include such data as ally authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and ally inputs and outputs such as receiving commands from and providing displays to the ally.

The server computer 106, as illustrated, includes an input and output system 136, referring to, including, or operatively coupled with, ally input devices and ally output devices, which are operatively coupled to the processing device 120. The output devices include a display 108 (e.g., a liquid crystal display or the like), which can be, as a non-limiting example, a touch screen, which serves both as an output device, by providing graphical and text indicia and presentations for viewing, and as an input device, by providing virtual buttons, selectable options, a virtual keyboard, and other indicia that, when touched, control the server computer 106. The output devices may include a speaker or other audio device.

The server computer 106 may also include a positioning device (not shown), which can be for example a global positioning system device (GPS) configured to be used by a positioning system to determine a location of the ally device 106. For example, the positioning system device may include a GPS transceiver. In some embodiments, the positioning system device includes an antenna, transmitter, and receiver. For example, in one embodiment, triangulation of cellular signals may be used to identify the approximate location of the server computer 106.

In the illustrated example, a system intraconnect, connects, for example electrically, the various described, illustrated, and implied components of the server computer 106. The intraconnect, in various non-limiting examples, can include or represent, a system bus, a high-speed interface connecting the processing device 120 to the memory device 122, individual electrical connections among the components, and electrical conductive traces on a motherboard common to some or all of the above-described components of the ally device. As discussed herein, the system intraconnect may operatively couple various components with one another, or in other words, electrically connects those components, either directly or indirectly—by way of intermediate component(s)—with one another.

The server computer 106, includes a communication interface 150, by which the server computer 106 communicates and conducts transactions with other devices and systems. The communication interface 150 may include digital signal processing circuitry and may provide two-way communications and data exchanges, for example wirelessly via wireless communication device, and for an additional or alternative example, via wired or docked communication by mechanical electrically conductive connector. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the server computer 106 may be configured to operate with one or more air interface standards, communication protocols, modulation types, and access types. By way of illustration, the server computer 106 may be configured to operate in accordance with any of a number of first, second, third, fourth, fifth-generation communication protocols and/or the like. For example, the server computer 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The server computer 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the server computer 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The server computer 106 further includes a power source 128, such as a battery, for powering various circuits and other devices that are used to operate the server computer 106. Embodiments of the server computer 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The apparatus and system 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

Referring now to another aspect of FIG. 1, as shown according to one embodiment, the server computer 106 may cause to be executed computer program code which collects and stores raw patron clickstream data 160 in memory 122. Patron clickstream data may include a detailed log of how patrons navigate through websites or mobile applications. By way of one non-limiting example, each and every click made by a patron, such as a mouse click or touchscreen tap, is collected and stored. A person of ordinary skill will recognize that in addition to including webpage clicks, clickstream data may include other metrics such as time spent on a given page. This data is collected for a predetermined period of time. According to embodiments of the invention, the predetermined period of time may be one month, or in an alternate embodiment, the predetermined period of time may be ninety days. During a ninety day period, some patrons will have many thousands of clicks whereas others may only have a few hundred.

According to one example, where patron clickstream data is gathered across a large enterprise for a period of ninety days, there might be as many as 100,000 patrons, approximately 50 k potential unique pages, and a theoretical two billion page transitions.

After the period of time has run, the server computer 106 then transforms this patron clickstream data into a probability matrix 162. FIG. 3 illustrates one partial view of how the probability matrix operates in at least one embodiment. In particular, the step of transforming the raw data into the probability matrix 162 analyzes the probability that patron will transition from Page A to Page B, P(A|B), for each page based on the raw patron clickstream data. As part of this step, the dimensionality of the data is reduced and is transformed into a form that is more manageable by the UMAP Transform 164. The reduction of dimensionality makes the UMAP more efficient.

Accordingly, the next step is to further transform the probability data in the probability matrix into just two dimensions using a UMAP Transform algorithm 164. UMAP (Uniform Manifold Approximation and Projection) is a manifold learning technique for dimension reduction. UMAP is constructed from a theoretical framework based in Riemannian geometry and algebraic topology. Transforming the data into two dimensions using UMAP makes the patron clickstream data both more manageable and also easier to graphically visualize. In particular, applying UMAP may useful in beginning to cluster data using machine learning. FIG. 4, discussed further below, is a graphical depiction of patron clickstream data that has been graphically depicted following dimensionality reduction of UMAP 164 and other processes 166, 168 discussed below. Applying the UMAP algorithm makes DBSCAN algorithm, applied in the next step 166, more efficient.

After the data has been transformed by the UMAP algorithm, the data may begin to be clustered via the application of a DBSCAN algorithm 166. Density-based spatial clustering of applications with noise (DBSCAN) is a data clustering algorithm that is may be used in data mining and machine learning. Based on a set of points DBSCAN groups together points that are close to each other based on a distance measurement (usually Euclidean distance) and a minimum number of points. According to one embodiment of the present invention, the DBSCAN algorithm may be used to help identify the center of a cluster of points on the graphs created by the UMAP algorithm. Identifying the center of a cluster via the DBSCAN algorithm 166 may be beneficial to understanding the underlying aspects of the particular cluster and also as a first step in determining the bounds of a cluster.

After the data has been feed into the DBSCAN algorithm 166, the clusters still need to have their boundaries defined. Accordingly, the next step is to apply a KNN algorithm 168. The KNN algorithm 168 (K-Nearest Neighbor) as used here takes the center of the cluster, as identified by the DBSCAN algorithm 166, and further identifies related data points closest to the center of each cluster in order to better define the data points in the cluster. In the graph shown in FIG. 4, it is the KNN algorithm that helps shade each cluster with their representative color/shade so that edges of the clusters may be determined.

As shown in FIG. 1, after the KNN algorithm has been applied to the data, the graph may be illustrated 170 on the display 108.

Referring now to FIG. 2, as additional steps may be applied in alternate embodiments of the invention. For instance, after the UMAP has been applied to reduce dimensionality but before the DBSCAN algorithm is applied, it may be beneficial to downsample the two dimensional data 174. As part of this process, rather than apply the full 100,000 patron clickstreams, it may be useful to reduce this number to 5,000 patron clickstreams. That is, downsampling the data will eliminate less dense regions of the clusters so that the center of the cluster may be more efficiently obtained by the DBSCAN.

According to another embodiment of the invention, as also shown in FIG. 2, it may be beneficial to repeated the entire process after the predetermined period of time has elapsed 172. In this way, additional data may be collected and transformed using the processes of the present invention in order to track changes in the clusters over time. According to one aspect of this embodiment, the cluster data may be stored in the memory 122. Over time, trends and changes (or lack thereof) in clusters may be analyzed.

Referring now to FIG. 4, after raw patron clickstream data has been collected 160, transformed into a probability matrix 162, transformed into two dimensions by the UMAP algorithm 164, clustered by the DBSCAN algorithm 166, and shaded by the KNN algorithm 168 a cluster graph may be depicted on the display. Various clusters, 300, 301, 302, 303, 304, and 305 may be easily visible. This end product graph is particularly helpful in visualizing and analyzing the patron clickstream data and would have been impossible absent the series of transformations detailed herein.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. An apparatus for improving efficiency of clickstream data processing comprising:
a processor; and
a memory including instructions that, when executed by the processor, cause the processor to:
extract the clickstream data;
transform the clickstream data into a probability matrix, wherein the clickstream data comprises a plurality of pages and the probability matrix comprises a plurality of entries, each entry of the probability matrix comprising a respective probability of proceeding from a first one of the plurality of pages to a second one of the plurality of pages;
transform the probability matrix into two dimensional data by reducing dimensionality of the probability matrix using a Uniform Manifold Approximation and Projection algorithm (UMAP);
generate, by a Density Based Spatial Clustering of Applications with Noise (DBSCAN) algorithm based on the two dimensional data, a cluster graph visualizing a plurality of clusters of the two dimensional data;

determine, by the DBSCAN algorithm based on the two dimensional data, a respective center of each cluster of the plurality of clusters;

process, by a K-Nearest Neighbor (KNN) algorithm, the generated cluster graph and the determined centers of each cluster, to determine a respective subset of data points of the two dimensional data closest to the center of each cluster;

determine, based on the subsets of the data points of the two dimensional data determined by the KNN algorithm, a respective edge of each cluster;

shade, based on the determined edges of each cluster, each of the data points within each respective subset to graphically identify each cluster of the plurality of clusters in the cluster graph; and output the cluster graph on a display.

2. The apparatus of claim 1, wherein the memory further includes instructions that, when executed by the processor, cause the processor to:

prior to the extraction of the clickstream data, first receive and store in the memory of the computer clickstream data over a predetermined period of time.

3. The apparatus of claim 2, wherein the predetermined time period is 90 days.

4. The apparatus of claim 3, wherein the predetermined time period is one month.

5. The apparatus of claim 2, wherein the clickstream data comprises clickstreams received from a mobile based platform and/or a web based platform.

6. The apparatus of claim 5, wherein the clickstream data further comprises data from 100,000 patrons who utilize the mobile based platform and/or the web based platform.

7. The apparatus of claim 2, wherein the apparatus is characterized by a lack of any step utilizing functionality of a Natural Language Processing algorithm.

8. The apparatus of claim 1, wherein the memory further includes instructions that, when executed by the processor, cause the processor to:

label observations of each cluster of the plurality of clusters based on common features following the application of the KNN algorithm.

9. The apparatus of claim 1, wherein the memory further includes instructions that, when executed by the processor, cause the processor to:

downsample the two dimensional data from the UMAP algorithm; and use the downsampled data to reduce the density before the application of the DBSCAN algorithm.

10. The apparatus of claim 9, wherein the memory further includes instructions that, when executed by the processor, cause the processor to:

label the remaining data points in the respective clusters.

11. The apparatus of claim 1, wherein the apparatus is characterized by a lack of any step utilizing functionality of a Natural Language Processing algorithm.

12. The apparatus of claim 1, wherein the apparatus is characterized by a lack of any step utilizing functionality of a Natural Language Processing algorithm.

13. The apparatus of claim 1, wherein the apparatus is characterized by a lack of any step utilizing functionality of a Natural Language Processing algorithm.

14. The apparatus of claim 1, wherein the memory further includes instructions that, when executed by the processor, cause the processor to:

receive additional clickstream data and transform the additional clickstream data into another probability matrix;

transform the another probability matrix by reducing dimensionality into two dimensional data using UMAP;

generate, based on the transformed another probability matrix, another cluster graph visualizing another plurality of clusters; and determine, based on a first cluster of the another plurality of clusters of the another cluster graph, a change in a first cluster of the plurality of clusters of the cluster graph.

15. The apparatus of claim 1, wherein the DBSCAN algorithm generates a first cluster of the plurality of clusters including a first data point of the two dimensional data and a second cluster of the plurality of clusters including a second data point of the two dimensional data.

16. The apparatus of claim 15, wherein the first data point is within the edges of the first cluster and the second data point is within the edges of the second cluster.

17. The apparatus of claim 16, wherein the first cluster is shaded according to a first shade and the second cluster is shaded according to a second shade, wherein the first shade is different than the second shade.

18. The apparatus of claim 17, wherein the KNN algorithm excludes the first data point from the second cluster based on the determined edges of the first cluster, wherein the KNN algorithm excludes the second data point from the first cluster based on the determined edges of the second cluster.

19. The apparatus of claim 18, wherein the KNN algorithm excludes the first data point from the second cluster further based on the first data point not being within a predetermined distance of the center of the second cluster, wherein the KNN algorithm excludes the second data point from the first cluster further based on the second data point not being within the predetermined distance of the center of the first cluster.

20. The apparatus of claim 19, wherein the KNN algorithm shades each of the data points.

\* \* \* \* \*